US012028926B2

(12) United States Patent
Chen (10) Patent No.: US 12,028,926 B2
(45) Date of Patent: *Jul. 2, 2024

(54) HANDLING AN ATTEMPT TO RESUME A WIRELESS CONNECTION USING A BASE STATION THAT SUPPORTS A DIFFERENT CORE-NETWORK TYPE

(71) Applicant: Google LLC, Mountain View, CA (US)

(72) Inventor: Teming Chen, Taipei (TW)

(73) Assignee: Google LLC, Mountain View, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/656,349

(22) Filed: Mar. 24, 2022

(65) Prior Publication Data

US 2022/0217808 A1 Jul. 7, 2022

Related U.S. Application Data

(63) Continuation of application No. 16/759,258, filed as application No. PCT/US2019/045224 on Aug. 6, 2019, now Pat. No. 11,330,662.

(Continued)

(51) Int. Cl.
*H04W 76/27* (2018.01)
*H04W 36/08* (2009.01)
(Continued)

(52) U.S. Cl.
CPC ........... *H04W 76/27* (2018.02); *H04W 36/08* (2013.01); *H04W 48/08* (2013.01); *H04W 76/10* (2018.02); *H04W 76/30* (2018.02); *H04W 88/06* (2013.01)

(58) Field of Classification Search
CPC ..... H04W 76/27; H04W 36/08; H04W 48/08; H04W 76/10; H04W 76/30; H04W 88/06;
(Continued)

(56) References Cited

U.S. PATENT DOCUMENTS 11,330,662 B2 5/2022 Chen
2013/0344872 A1* 12/2013 Nukala ............. H04W 52/0238
455/437

(Continued)

FOREIGN PATENT DOCUMENTS

KR 20140043138 4/2014
KR 101451945 10/2014
(Continued)

OTHER PUBLICATIONS

"3GPP TSG-RAN WG2 Meeting #110 elecctronic online", R2-xxxxx, Jun. 2020, 180 pages.

(Continued)

*Primary Examiner* — Will W Lin
(74) *Attorney, Agent, or Firm* — Colby Nipper PLLC (57) ABSTRACT

This document describes techniques and devices for handling an attempt to resume a wireless connection using a base station that supports a different core-network type. While in a current resource control state, such as an inactive state 332, a user equipment (UE) 111 or 112 selects a base station 124 with a different core-network type than a previously selected base station 122 or 121. In some cases, this selected base station 124 does not support the current resource control state or does not enable the UE 111 or 112 to transition to a different resource control state, such as a connected state 330. Consequently, if the UE 111 or 112 attempts to perform a procedure that would result in the UE 111 or 112 transitioning to the unsupported resource control state, the procedure may fail and consequently waste network resources or delay communications with the UE 111 or 112.

20 Claims, 5 Drawing Sheets

Related U.S. Application Data (60) Provisional application No. 62/716,725, filed on Aug. 9, 2018.

(51) Int. Cl.
  *H04W 48/08* (2009.01)
  *H04W 76/10* (2018.01)
  *H04W 76/30* (2018.01)
  *H04W 88/06* (2009.01)

(58) Field of Classification Search
  CPC ..... H04W 76/00; H04W 36/14; H04W 68/06; H04W 76/19; H04W 76/38
  See application file for complete search history.

(56) References Cited

U.S. PATENT DOCUMENTS

| | | |
|---|---|---|
| 2016/0278160 A1 | 9/2016 | Schliwa-Bertling et al. |
| 2017/0265113 A1 | 9/2017 | Lindoff et al. |
| 2017/0332436 A1 | 11/2017 | Chen |
| 2017/0347296 A1* | 11/2017 | Wu .................. H04W 36/0033 |
| 2018/0020418 A1 | 1/2018 | Chandramouli et al. |
| 2018/0234941 A1 | 8/2018 | Kim et al. |
| 2018/0352601 A1* | 12/2018 | Park .................. H04W 36/305 |
| 2019/0052435 A1 | 2/2019 | Martin .................. H04W 76/27 |
| 2019/0254101 A1* | 8/2019 | Lee .................. H04W 76/22 |
| 2019/0349825 A1* | 11/2019 | Tseng .................. H04W 48/18 |
| 2019/0357037 A1 | 11/2019 | Velev et al. |
| 2019/0364462 A1 | 11/2019 | Kim et al. |
| 2020/0120585 A1 | 4/2020 | Kumar et al. |
| 2020/0260364 A1 | 8/2020 | Vandervelde et al. |
| 2020/0280890 A1 | 9/2020 | Vikberg et al. |
| 2020/0323018 A1 | 10/2020 | Chen |
| 2021/0022200 A1 | 1/2021 | Mildh et al. |
| 2021/0120618 A1* | 4/2021 | Lee .................. H04W 76/19 |

FOREIGN PATENT DOCUMENTS

| | | |
|---|---|---|
| KR | 20160102086 | 8/2016 |
| KR | 20160131077 | 11/2016 |
| KR | 20160135432 | 11/2016 |
| WO | 2017048170 | 3/2017 |
| WO | 2018043862 | 3/2018 |
| WO | 2018062848 | 4/2018 |
| WO | 2018085713 | 5/2018 |
| WO | 2018128571 | 7/2018 |
| WO | 2019074325 | 4/2019 |
| WO | 2020033356 | 2/2020 |

OTHER PUBLICATIONS

"Corrections to C-IoT Optimisations in Stage-2", 3GPP TSG-RAN WG2 Meeting #95, Gothenburg, Sweden, Aug. 2016, 12 pages.
"Email Discussion Report on [101bis#38][LTE/5GC] Inactive and RRC Open Issues", 3GPP TSG RAN WG2 Meeting #102 R2-180xxxx, May 2018, 10 pages.
"Foreign Office Action", EP Application No. 19753585.9, Jan. 18, 2022, 6 pages.
"Foreign Office Action", KR Application No. 10-2020-7011949, Feb. 24, 2021, 20 pages.
"Foreign Office Action", KR Application No. 10-2020-7011949, Sep. 23, 2021, 6 pages.
"Foreign Office Action", IN Application No. 202047018178, Nov. 3, 2021, 6 pages.
"International Preliminary Report on Patentability", Application No. PCT/US2019/045224, Feb. 9, 2021, 7 pages.
"International Search Report and Written Opinion", Application No. PCT/US2019/045224, Dec. 4, 2019, 14 pages.
"Non-Final Office Action", U.S. Appl. No. 16/759,258, filed Sep. 16, 2021, 17 pages.
"Notice of Allowance", U.S. Appl. No. 16/759,258, filed Jan. 5, 2022, 9 pages.
"RRC connection establishment, re-establishment and resume", 3GPP TSG-RAN WG2 Meeting #98—R2-1705247, May 2017, 4 pages.
"Foreign Notice of Allowance", KR Application No. 10-2020-7011949, Apr. 18, 2022, 3 pages.
"Foreign Office Action", KR Application No. 10-2022-7022119, Jul. 8, 2022, 6 pages.
"Foreign Office Action", VN Application No. 1-2020-02453, Jun. 26, 2023, 3 pages.
"Foreign Office Action", EP Application No. 19753585.9, Oct. 24, 2023, 4 pages.

\* cited by examiner

HANDLING AN ATTEMPT TO RESUME A WIRELESS CONNECTION USING A BASE STATION THAT SUPPORTS A DIFFERENT CORE-NETWORK TYPE

RELATED APPLICATION(S)

This application is a continuation of and claims priority to U.S. Non-Provisional patent application Ser. No. 16/759,258, filed on Apr. 24, 2020, which in turn is a National Stage Entry and claims priority to International Patent Application Serial No. PCT/US2019/045224, filed on Aug. 6, 2019, which in turn claims priority to U.S. Provisional Patent Application Ser. No. 62/716,725, filed on Aug. 9, 2018, the disclosures of which are incorporated by reference herein in their entireties.

BACKGROUND

The evolution of wireless communication to Fifth-Generation (5G) standards and technologies provide higher data rates and greater capacity, with improved reliability and lower latency, which enhances mobile broadband services. 5G technologies also provide new classes of services for vehicular, fixed wireless broadband, and the Internet of Things (IoT). The specification of the features in the 5G air interface is defined as 5G New Radio (5G NR).

To communicate wirelessly with a network, a user equipment (UE) may establish a connection to the network using a base station (e.g., a serving cell) that supports a Fifth-Generation core network (5GC), an Evolved Packet Core (EPC), or both. After suspending the connection to the network, the UE may perform a cell-selection procedure that selects a different base station. If the selected base station supports a different core-network type than the previous base station, however, an attempt to resume the connection to the network using the selected base station may fail.

SUMMARY

Techniques and apparatuses are described that handle an attempt to resume a connection using a base station that supports a different core-network type. In particular, a resource control module of a UE determines whether or not a core-network type supported by a currently selected base station differs from a core-network type supported by a previously-selected base station before performing a connection-resume procedure. If the core-network types differ, the resource control module performs another action prior to or instead of performing the connection-resume procedure. As an example action, the resource control module releases the wireless connection to the network, performs a connection-establishment procedure with the second base station, postpones the connection-resume procedure, or sends a message to an upper layer. In this way, the resource control module takes steps to proactively avoid performing a connection-resume procedure that may fail due to differences in core-network types.

Aspects described below include a method performed by a user equipment for handling an attempt to resume a wireless connection using a base station that supports a different core-network type. The method includes establishing a wireless connection to a network using a first base station that supports a first core-network type. The method also includes suspending the wireless connection to the network and performing a cell-selection procedure that selects a second base station. The method additionally includes processing system information received from the second base station to determine that the second base station supports a second core-network type and determining that the second core-network type differs from the first core-network type. The method further includes detecting a trigger that initiates a connection-resume procedure. Responsive to detecting the trigger and determining that the second core-network type is different, the method includes performing one or more operations comprising: releasing the wireless connection to the network; performing a connection-establishment procedure using the second base station; postponing the connection-resume procedure; or sending a message to an upper layer.

Aspects described below also include a user equipment comprising a radio-frequency transceiver. The UE also includes a processor and memory system configured to perform any of the methods described.

Aspects described below also include a system with means for handling an attempt to resume a wireless connection to a network using a base station that supports a different core-network type by performing at least one of the following: releasing the connection to the network, performing a connection-establishment procedure using the cell, postponing a connection-resume procedure, or sending a message to an upper layer.

BRIEF DESCRIPTION OF THE DRAWINGS

Apparatuses of and techniques for handling an attempt to resume a wireless connection using a base station that supports a different core-network type are described with reference to the following drawings. The same numbers are used throughout the drawings to reference like features and components.

DETAILED DESCRIPTION

Overview

This document describes techniques and devices for handling an attempt to resume a wireless connection using a base station that supports a different core-network type. While in a current resource control state, such as an inactive state, a user equipment (UE) can select a base station that supports a different core-network type than a previous base station. In some cases, this selected base station may not support the current resource control state or may not enable the UE to transition to a different resource control state, such as a connected state. Consequently, if the UE attempts to perform a procedure to transition the UE to a different resource control state, the procedure may fail. The failure may result in wasted network resources or delayed communications with the UE.

These techniques and devices enable handling an attempt to resume a wireless connection using a base station that supports a different core-network type. In particular, a resource control module of a UE determines whether or not a core-network type supported by a currently selected base station differs from a core-network type supported by a previously-selected base station before performing a connection-resume procedure. If the core-network types differ, the resource control module performs another action prior to or instead of performing the connection-resume procedure. As an example action, the resource control module releases the wireless connection to the network, performs a connection-establishment procedure with the second base station, postpones the connection-resume procedure, or sends a message to an upper layer. In this way, the resource control module takes steps to proactively avoid performing a connection-resume procedure that may fail due to differences in core-network types.

Example Environment

Figure 1:
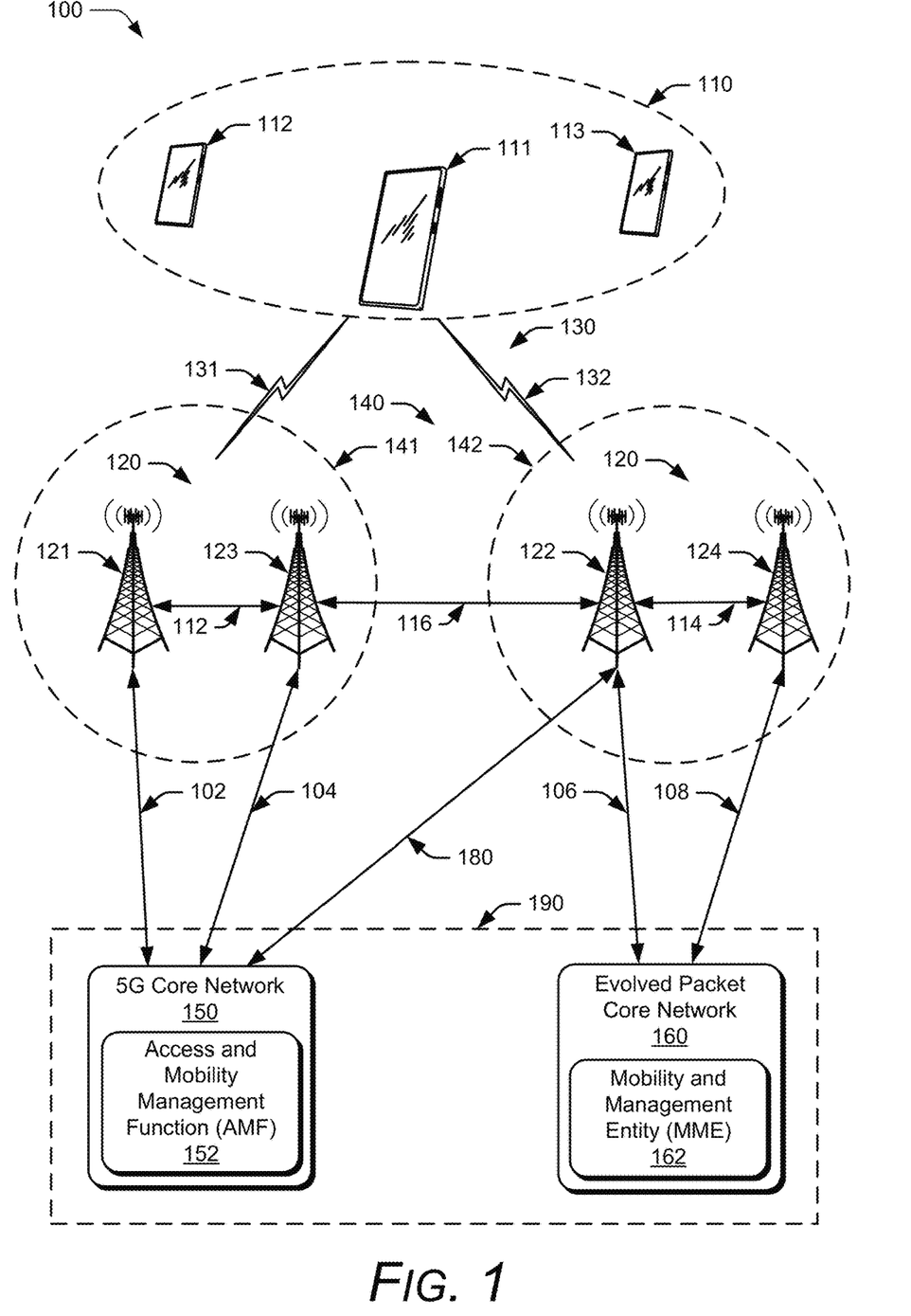
FIG. 1 illustrates an example wireless network environment in which handling an attempt to resume a wireless connection using a base station that supports a different core-network type can be implemented.

FIG. 1 illustrates an example environment 100, in which handling an attempt to resume a wireless connection using a base station that supports a different core-network type can be implemented. The environment 100 includes multiple UEs 110, illustrated as UE 111, UE 112, and UE 113. Each UE 110 communicates with one or more base stations 120 (illustrated as base stations 121, 122, 123, and 124) through one or more wireless communication links 130 (wireless link 130), illustrated as wireless links 131 and 132. Although illustrated as a smartphone, the UE 110 can be implemented as any suitable computing or electronic device, such as a mobile communication device, a modem, a cellular phone, a gaming device, a navigation device, a media device, a laptop computer, a desktop computer, a tablet computer, a smart appliance, a vehicle-based communication system, and the like. The base station 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, or the like) can be implemented in a macrocell, microcell, small cell, picocell, or the like, or any combination thereof.

The base stations 120 communicate with the UE 110 using the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 include one or more wireless links or bearers implemented using any suitable communication protocol or standard, or combination of communication protocols or standards such as 3rd Generation Partnership Project Long-Term Evolution (3GPP LTE), Enhanced Long-Term Evolution (eLTE), Fifth-Generation New Radio (5G NR), Fourth-Generation (4G) standard, and so forth. Multiple wireless links 130 can be aggregated in a carrier aggregation to provide a higher data rate for the UE 110. Multiple wireless links 130 from multiple base stations 120 can be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN) that each use a Radio Access Technology (RAT). The RANs 140 include an NR RAN 141 and an E-UTRAN 142. In FIG. 1, core networks 190 include a Fifth-Generation Core (5GC) network 150 (5GC 150) and an Evolved Packet Core (EPC) network 160 (EPC 160), which are different types of core networks. The base stations 121 and 123 in the NR RAN 141 are connected to the 5GC 150. The base stations 122 and 124 in the E-UTRAN 142 connect to the EPC 160. Optionally or additionally, the base station 122 connects to both the 5GC 150 and EPC 160.

The base stations 121 and 123 connect, at 102 and 104 respectively, to the 5GC 150 using an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. If the base station 122 connects to both the 5GC 150 and EPC 160, the base station 122 can connect to the 5GC 150 using an NG2 interface for control-plane signaling and using an NG3 interface for user-plane data communications, at 180. In addition to connections to core networks 190, base stations 120 can communicate with each other. The base stations 121 and 123 communicate using an Xn interface at 112, for instance. The base stations 122 and 124 communicate using an X2 interface at 114. The base stations 122 and 123 can communicate using an Xn interface at 116 to execute a handover procedure.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110 through the base stations 120.

The UE 110 supports eLTE or a variety of different RATs, such as 5G NR and 4G. Different situations can cause the UE 110 to transition among different resource control states as determined by the RAT. Example resource control states include a connected state in which the UE 110 establishes a wireless connection to a network using the base station 120, an inactive state in which the UE 110 suspends the wireless connection to the network, or an idle state in which the UE 110 releases the wireless connection to the network. While in the inactive state, for example, the UE 110 performs the cell-selection procedure. In some cases, the cell-selection procedure selects a second base station that supports a core-network type that is different from the core-network type supported by the previous cell. As such, the selected base station may not support the inactive state or may not enable a wireless connection to a network to be resumed from the inactive state through a connection-resume procedure (e.g., a radio-resource-control (RRC) connection-resume procedure). In general, the connection-resume procedure enables the UE 110 to transition from the inactive state to the connected state and resume the connection to the RAN 140. Components of the UE 110 are further described with respect to FIG. 2.

Example Device

Figure 2:
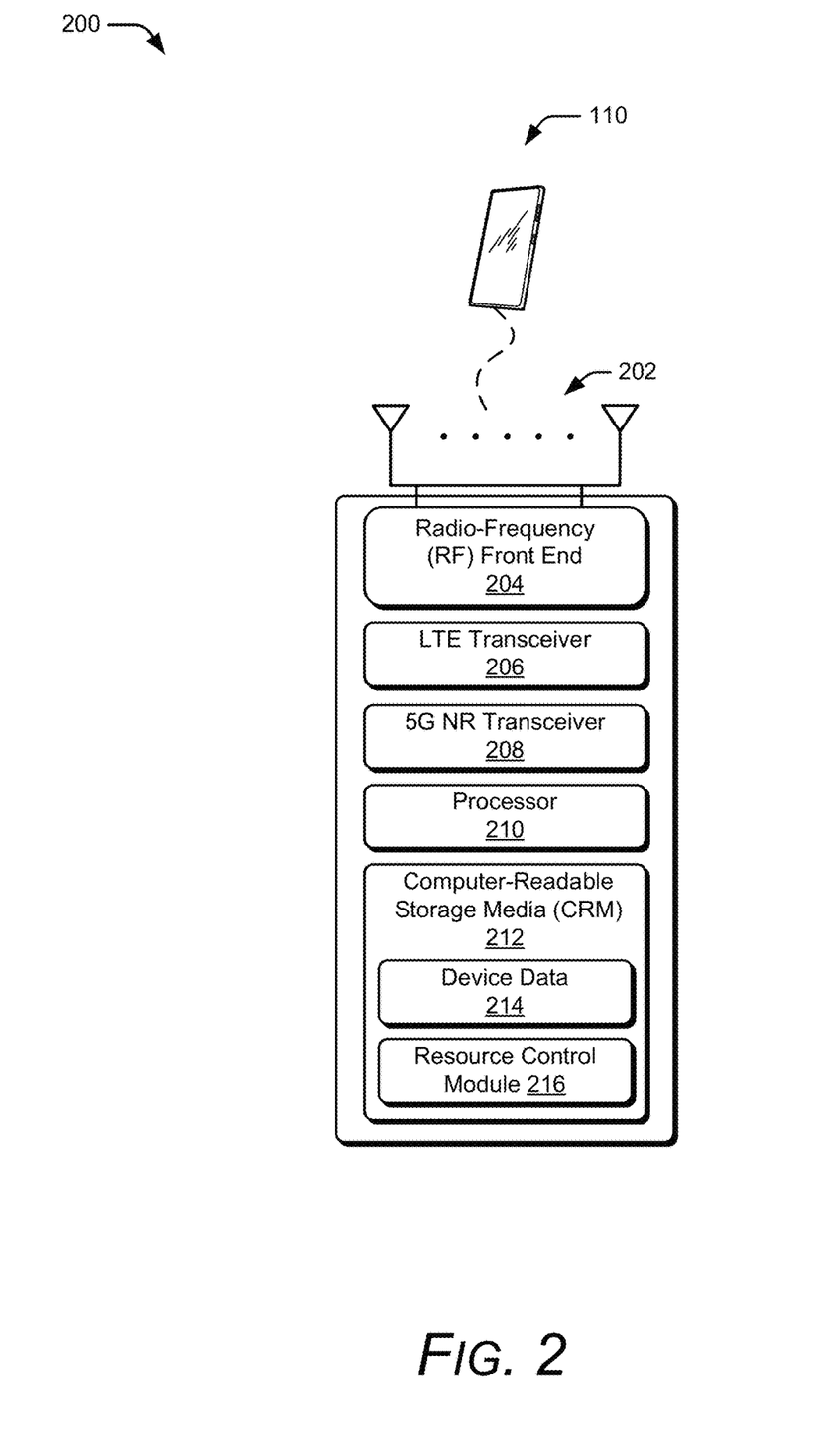
FIG. 2 illustrates an example user equipment for handling an attempt to resume a wireless connection using a base station that supports a different core-network type.

FIG. 2 illustrates an example device diagram 200 of the UE 110. The UE 110 can include additional functions and interfaces that are omitted from FIG. 2 for the sake of clarity. In the depicted configuration, the UE 110 includes antennas 202, a radio-frequency (RF) front end 204 (RF front end 204), a radio-frequency transceiver, including, for example, an LTE transceiver 206, and/or a 5G NR transceiver 208 for communicating with one or more base stations 120 in the RAN 140. The RF front end 204 couples or connects the LTE transceiver 206 and the 5G NR transceiver 208 to the antennas 202 to facilitate various types of wireless communication. The antennas 202 can include an array of multiple antennas that are configured similar to or differently from each other. The antennas 202 and the RF front end 204 are tuned to one or more frequency bands defined by the 3GPP LTE and 5G NR communication standards and implemented by the LTE transceiver 206 and/or the 5G NR transceiver 208.

The UE 110 also includes one or more processors 210 and memory system including, for example, computer-readable storage media 212 (CRM 212). The processor 210 can be a single core processor or a multiple core processor composed of a variety of materials, such as silicon, polysilicon, high-K dielectric, copper, and so on. The computer-readable storage media excludes propagating signals and the CRM 212 includes any suitable memory or storage device, such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by the processor 210 to enable user-plane communication, control-plane signaling, and user interaction with the UE 110.

The CRM 212 also includes a resource control module 216. Alternately or additionally, the resource control module 216 can be implemented in whole or part as hardware logic or circuitry integrated with or separate from other components of the UE 110. The resource control module 216 implements an RRC layer, as described according to the wireless communication standard. The resource control module 216 determines the resource control state (e.g., the connected state, the inactive state, or the idle state) and performs operations according to the resource control state. Instead of directly performing a connection-resume procedure, the resource control module 216 evaluates a core-network type of a currently selected cell. If the core-network type does not support the current resource control state or differs from a previous cell's core-network type, the resource control module 216 performs other actions prior to or instead of performing the connection-resume procedure. The resource control module 216 can at least partially implement handling an attempt to resume a wireless connection using a base station that supports a different core-network type, as further described in FIGS. 3-5.

Figure 3:
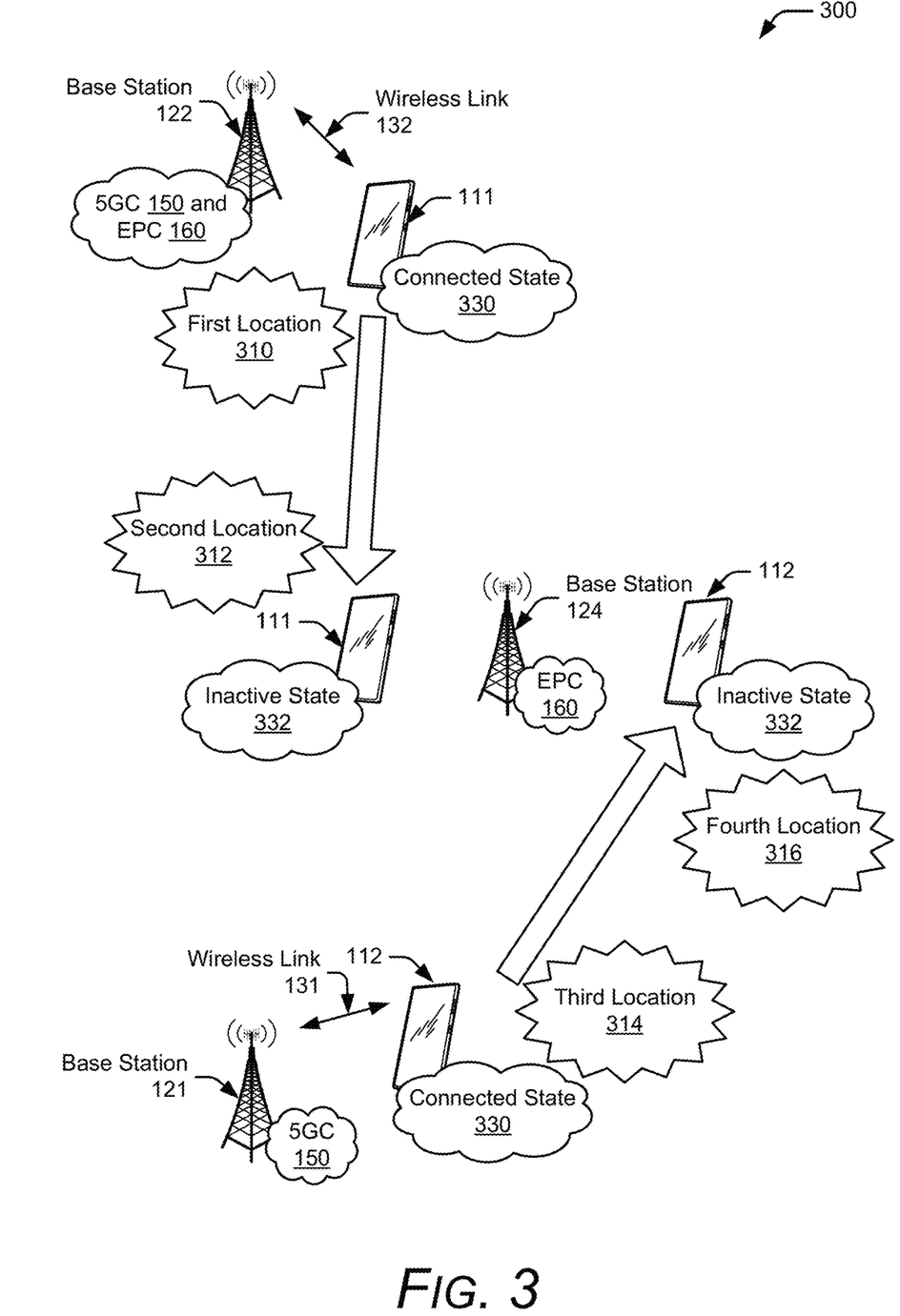
FIG. 3 illustrates another example environment in which a user equipment may attempt to resume a connection using a base station that supports a different core-network type.

Handling an Attempt to Resume a Wireless Connection Using a Base Station that Supports a Different Core-Network Type FIG. 3 illustrates another example environment 300 in which the UEs 111 and 112 move to different geographical locations that are serviced by different base stations 121, 122, and 124 of FIG. 1. In this example, the base station 121 is a gNB and supports the 5GC 150. In contrast, the base station 124 is an ng-eNB or an eNB that supports the EPC 160. The base station 122 is another ng-eNB that supports both the 5GC 150 and EPC 160.

Consider that the UE 111 supports eLTE and is positioned at a first location 310, which is proximate to the base station 122. The UE 111 performs a cell-selection procedure that selects the base station 122, establishes a wireless link 132 with the base station 122, and operates in a connected state 330. After some period of time, the UE 111 transitions from the connected state 330 to an inactive state 332. In some cases, the UE 111 receives a request message from the base station 122 (shown in FIG. 4) that directs the UE 111 to transition from the connected state 330 to the inactive state 332. The request message can be a radio-resource-control (RRC) connection-release message.

While in the inactive state 332, the UE 111 moves to a second location 312, which is proximate to the base station 124. The UE 111 performs a second cell-selection procedure to select or determine a second base station. The cell-selection procedure can alternatively be referred to as a cell-reselection procedure, which enables the UE 111 to change or switch to a different base station 120 within the RAN 140. In this example, the UE 111 selects the base station 124, which supports the EPC 160 and not the 5GC 150. Consequently, the base station 124 does not support the inactive state 332 and does not support a connection-resume procedure that enables the UE 111 to transition from the inactive state 332 to the connected state 330. Since the currently selected base station 124 does not support the inactive state 332, a future attempt to perform the connection-resume procedure will fail.

A similar problem occurs if the UE 110 performs an inter-RAT cell-selection procedure, as described with respect to UE 112. Consider that the UE 112 is positioned at a third location 314, which is proximate to the base station 121. The UE 112 performs a cell-selection procedure that selects the base station 121, establishes the wireless link 131 with the base station 121, and operates in the connected state 330. After some time period, the UE 112 transitions from the connected state 330 to the inactive state 332, similar to the UE 111. Additionally, the UE 112 moves to a fourth location 316, which is proximate to the base station 124. At the fourth location 316, the UE 112 performs a cell-selection procedure that selects the base station 124, which supports a different core-network type compared to the core-network type supported by the base station 121. Since the core-network type supported by the base station 124 does not support the inactive state 332, a future attempt to perform the connection-resume procedure while the base station 124 is selected will fail.

Figure 4:
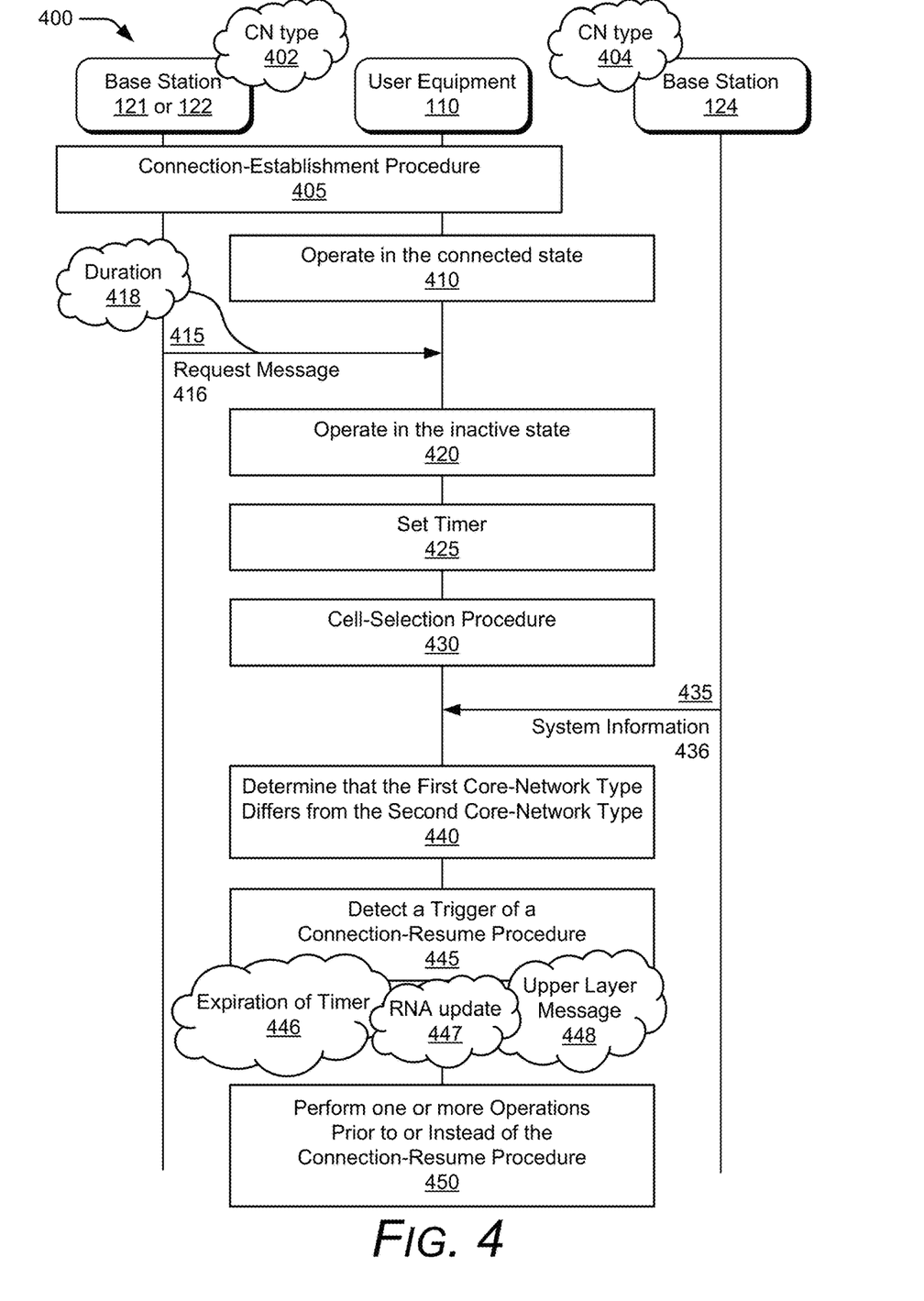
FIG. 4 illustrates example data and control transactions between a user equipment, a first base station, and a second base station.

To avoid wasting network resources or delaying communications that could be caused by a connection-resume procedure failure, the UE 110 performs other actions prior to or instead of performing the connection-resume procedure, as further described in FIG. 4. Although the UEs 111 and 112 are described as being in the inactive state 332, these techniques can be applied to other types of resource control states that may not be supported by the selected base station 120.

FIG. 4 illustrates example data and control transactions 400 between the UE 110, the first base station 121 or 122, and the second base station 124. In this example, the first base station 121 or 122 supports a first core-network (CN) type 402 and the second base station 124 supports a second core-network type 404, which differs from the first core-network type 402. As an example, the first core-network type 402 includes the 5GC 150 and the second core-network type 404 includes the EPC 160.

At 405, the first base station 121 or 122 and the UE 110 perform a connection-establishment procedure, which enables the UE 110 to wirelessly connect to the RAN 140 using the base station 121 or 122.

At 410, the UE 110 operates in the connected state 330.

At 415, the first base station 121 or 122 sends a request message 416 to the UE 110. The request message 416 directs the UE 110 to transition from the connected state 330 to the inactive state 332. In some cases, the request message 416 specifies a duration 418 for which the UE 110 operates in the inactive state 332 prior to performing a connection-resume procedure. An example request message 416 includes the RRC connection-release message, as described above with respect to FIG. 3.

At 420, the UE 110 transitions from the connected state 330 to the inactive state 332 and operates in the inactive state 332 according to the request message 416.

At 425, the UE 110 additionally sets a timer that triggers a connection-resume procedure upon expiration. In some cases, the UE 110 sets a duration of the timer based on a predetermined amount of time that is specified by the computer-readable storage media 212 of the UE 110. Alternatively, the UE 110 sets the duration of the timer according to the duration 418 specified by the request message 416.

At 430, the UE 110 performs a cell-selection procedure that selects the second base station 124. In some cases, the UE 110 selects the second base station 124 instead of the first base station 121 or 122 because the UE 110 moved to a new location that is closer to the second base station 124 (relative to the first base station 121 or 122). As an example, the UE 110 moves to the second location 312 or the fourth location 316 shown in FIG. 3.

At 435, the UE 110 receives system information 436 from the second base station 124. The system information 436 informs the UE 110 of the second core-network type 404 supported by the second base station 124.

At 440, the UE 110 determines that the first core-network type 402 supported by the first base station 121 or 122 differs from the second core-network type 404 supported by the second base station 124. Consequently, a connection-resume procedure with the selected base station 124 may fail. The UE 110 can also determine that a future connection-resume procedure will fail based on a determination that the second core-network type 404 does not support the inactive state 332 (e.g., the current resource control state of the UE 110).

At 445, the UE 110 detects a trigger that initiates a connection-resume procedure. One example trigger includes an expiration of the timer 446, which was previously set at 425. A second example trigger includes a request to perform a radio-access-network notification-area (RNA) update 447. The RNA update 447 provides a single identity (e.g., a RAN area identity, a cell identity, or a Public Land Mobile Network (PLMN) identity) or a list of identities (e.g., a list of cell identities) to the UE 110. In some situations, the RNA update 447 is triggered if a RAN notification area associated with the selected base station (e.g., the second base station 124) differs from the RAN notification area associated with the previously-selected base station (e.g., the first base station 121 or 122). The system information 436 can provide the RAN notification area associated with the second base station 124 to the UE 110. A third example trigger includes a message 448 from an upper layer, which triggers the RNA update 447 or the connection-resume procedure.

At 450, the UE 110 performs one or more operations prior to or instead of the connection-resume procedure. In particular, when it is determined that the first core-network type 402 differs from the second core-network type 404 and a trigger occurred, the UE 110 releases the wireless connection to the RAN 140 (e.g., transitions to the idle state), performs a connection-establishment procedure with the base station 124, postpones the connection-resume procedure, and/or sends a message to an upper layer, as further described with respect to FIG. 5. By determining that the first core-network type 402 differs from the second core-network type 404 at 440, the UE 110 can take action to avoid attempting a connection-resume procedure that wastes network resources or delays communications.

Example Method

Figure 5:
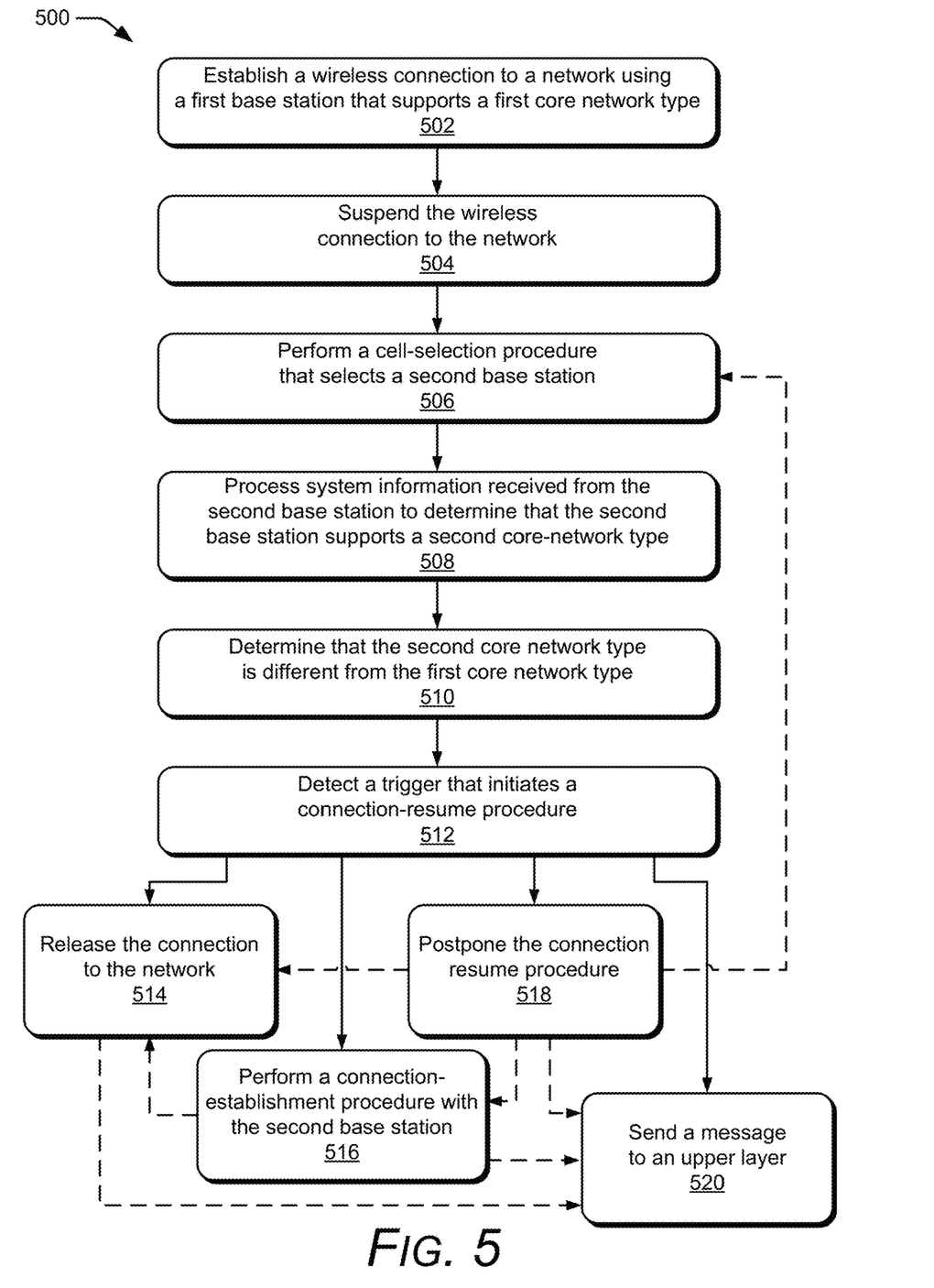
FIG. 5 illustrates an example method for handling an attempt to resume a wireless connection using a base station that supports a different core-network type.

FIG. 5 depicts an example method 500 for handling an attempt to resume a wireless connection using a base station that supports a different core-network type. Method 500 is shown as a set of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environment 100 of FIG. 1 or 300 of FIG. 3 and entities detailed in FIG. 2, reference to which is made for example only. The techniques are not limited to performance by one entity or multiple entities operating on one device.

At 502, a UE establishes a wireless connection to a network using a first base station that supports a first core-network type. For example, the UE 110 establishes a wireless link 130 to the RAN 140 of FIG. 1 using the base station 120, as shown in FIG. 1. In particular, the UE 110 performs a connection-establishment procedure (shown in FIG. 4) as specified by the wireless communication standard. The UE 110 also determines that the base station 122 supports the first core-network type 402, such as the 5GC 150, based on system information provided by the base station 120. In FIG. 3, the UE 111 establishes a wireless link 132 to the RAN 142 using the base station 122, which is implemented as a ng-eNB that supports both the 5GC 150 and the EPC 160. Additionally, or alternatively, the UE 112 establishes a wireless link 131 to the RAN 141 using the base station 121, which is implemented as a gNB that supports the 5GC 150.

At 504, the UE suspends the wireless connection to the network. For example, the UE 110 suspends the connection to the RAN 140. In some cases, the UE 110 suspends the connection responsive to receiving the request message 416 of FIG. 4 (e.g., an RRC connection-release message) from the base station 120. The request message directs the UE 110 to transition from the connected state 330 to the inactive state 332. Although described with respect to the inactive state 332, this step may alternatively involve transitioning to any second resource control state that is not supported by a second core-network type 404.

At 506, the UE performs a cell-selection procedure that selects a second base station. For example, the UE 110 performs the cell-selection procedure, which selects the base station 124. Continuing with the above example, the cell-selection procedure is performed while the UE 110 is in the inactive state 332.

At 508, the UE processes system information received from the second base station to determine that the second base station supports a second core-network type. For example, UE 110 processes the system information 436 to determine that the base station 124 supports the second core-network type 404. The system information 436 is received from the base station 124, as shown at 435 in FIG. 4.

At 510, the UE determines that the second core-network type is different from the first core-network type. For example, the UE 110 determines that the second core-network type 404 is different from the first core-network type 402. In particular, this can include determining that at least one difference between the first core-network type 402 and the second core-network type 404 is such that a connection-resume procedure with the second base station 124 may fail. In an example, determining that the second core-network type 404 is different from the first core-network type 402 includes determining that the second core-network type 404 and first core-network type 402 support different resource control states and/or different connection procedures. The UE 110 makes this determination based on system information 436 that is provided by the first base station 120 (e.g., the base station 121 or the base station 122) and the second base station 124.

As an example, the second core-network type 404 includes the EPC 160 and the first core-network type 402 includes the 5GC 150. Unlike the 5GC 150, the EPC 160 does not support the UE 110 in an inactive state 332 and does not support a connection-resume procedure that enables the UE 110 to transition from the inactive state 332 to the connected state 330. Therefore, the UE 110 determines that the second core-network type 404 is different from the first core-network type 402.

At 512, the UE detects a trigger that initiates a connection-resume procedure. For example, the UE 110 detects at least one of the following types of triggers: an expiration of a timer 446 that directs the UE 110 to perform the connection-resume procedure, a request to perform an RNA update 447, or a message 448 from the upper layer that directs the UE 110 to perform the connection-resume procedure, as described above with respect to FIG. 4. To avoid performing a connection-resume procedure with the second base station 124, which may fail due to the differences between the core-network types (e.g., differences between the EPC 160 and the 5GC 150), the UE 110 performs at least one of the operations at 514-520 prior to or instead of performing the connection-resume procedure.

At 514, the UE releases the wireless connection to the network. For example, the UE 110 releases the wireless connection to the RAN 140 by performing an RRC connection-release procedure. The UE 110 performs the RRC connection-release procedure with the first base station 122 or the second base station 124. This procedure causes the UE 110 to transition from the inactive state 332 to an idle state, which is supported by the EPC 160. Upon entering the idle state, the UE 110 deletes a resume UE context (e.g., an inactive UE context), a related identity (e.g., a resume identity or RNA identity), a security context, and so forth. In general, this step transitions the UE 110 from a current state that is not supported by the second core-network type 404 to a second state that is supported by the second core-network type 404.

At 516, the UE performs a connection-establishment procedure with the second base station. For example, the UE 110 performs the connection-establishment procedure with the base station 124 of FIG. 1 or 3 instead of performing the requested connection-resume procedure. The connection-establishment procedure is a procedure that is supported by the EPC 160, and therefore may succeed. If the connection-establishment procedure fails, the UE 110 can proceed to release the connection at 514 and enter the idle state.

At 518, the UE postpones the connection-resume procedure. For example, the UE 110 postpones the connection-resume procedure triggered at 512. This postponement provides an opportunity for the UE 110 to perform a second cell-selection procedure. The UE 110 postpones the connection-resume procedure based on a predetermined amount of time or a timer. After the specified amount of time, the UE 110 proceeds to release the connection at 514, perform the connection-establishment procedure at 516, remain in the inactive state and send a message to an upper layer at 520, or perform a second cell-selection procedure at 506. In some cases, the UE 110 continues performing multiple cell-selection procedures 506 until a base station 120 is selected that supports the first core-network type 402 (e.g., the 5GC 150). In other cases, the UE 110 keeps track of a timer or a total quantity of attempts and proceeds according to 514, 516, or 520 if a time limit or a maximum quantity of attempts has been reached. In some cases, the UE 110 continues performing cell-selection procedures at a predetermined time interval.

At 520, the UE sends a message is sent to an upper layer. For example, the UE 110 sends a message from the RRC layer to a mobility management layer, such as a non-access stratum (NAS) layer. The message indicates an intent or determination of the UE 110 to not perform the connection-resume procedure. In this case, the UE 110 continues to operate in the inactive state 332. In other cases, the UE 110 sends the message in response to the release of the connection at 514 or the connection-establishment procedure at 516.

Conclusion

Although techniques for handling an attempt to resume a wireless connection using a base station that supports a different core-network type have been described in language specific to features and/or methods, it is to be understood that the subject of the appended claims is not necessarily limited to the specific features or methods described. Rather, the specific features and methods are disclosed as example implementations of handling an attempt to resume a wireless connection using a base station that supports a different core-network type.

What is claimed is:

1. A method for a user equipment comprising:
   establishing a wireless connection to a network using a first base station that supports a first core-network type;
   suspending the wireless connection to the network;
   performing a cell-selection procedure that selects a second base station;
   processing system information received from the second base station to determine that the second base station supports a second core-network type different from the first core-network type; and
   responsive to the determining that the second core-network type is different, performing in place of initiating a connection-resume procedure an operation comprising:
   releasing the wireless connection to the network.

2. The method of claim 1, further comprising:
   sending a message to an upper layer.

3. The method of claim 1, further comprising:
   operating the user equipment in a first resource control state responsive to suspending the wireless connection to the network, wherein:
   the first core-network type supports the first resource control state; and
   the second core-network type does not support the first resource control state.

4. The method of claim 3, wherein:
   the first resource control state comprises an inactive state.

5. The method of claim 1, further comprising:
   detecting a trigger that initiates the connection-resume procedure; and
   responsive to detecting the trigger and determining that the second core-network type is different, performing one or more operations comprising:
   releasing the wireless connection to the network;

performing a connection-establishment procedure with the second base station;
postponing the connection-resume procedure; or
sending a message to an upper layer.

6. The method of claim 5, wherein:
the performing of the one or more operations comprises postponing the connection-resume procedure,
the method further comprising:
initiating a timer responsive to postponing the connection-resume procedure; and
performing a second cell-selection procedure responsive to an expiration of the timer.

7. The method of claim 6, further comprising:
responsive to the second cell-selection procedure selecting a third base station that supports the first core-network type, performing the connection-resume procedure to resume the wireless connection to the network using the third base station.

8. The method of claim 6, further comprising:
responsive to the second cell-selection procedure selecting a third base station that supports a third core-network type that differs from the first core-network type, detecting a second trigger that initiates the connection-resume procedure; and
responsive to detecting the second trigger, performing one or more second operations comprising:
releasing the wireless connection to the network;
performing the connection-establishment procedure with the third base station;
postponing the connection-resume procedure; or
sending the message to the upper layer.

9. The method of claim 5, the performing of the one or more operations comprising:
releasing the wireless connection to the network; and
responsive to releasing the wireless connection to the network, sending the message to the upper layer to indicate that the wireless connection to the network was released instead of performing the connection-resume procedure.

10. The method of claim 5, the performing of the one or more operations comprising:
performing the connection-establishment procedure with the second base station; and
responsive to performing the connection-establishment procedure, sending the message to the upper layer.

11. The method of claim 5, the performing of the one or more operations comprising:
sending the message to the upper layer by sending the message from a radio-resource control layer to a mobility management layer.

12. The method of claim 5, further comprising:
responsive to suspending the wireless connection to the network, setting a timer,
wherein the trigger comprises an expiration of the timer.

13. The method of claim 12, further comprising:
receiving a request message from the first base station,
wherein the suspending of the wireless connection to the network comprises suspending the wireless connection to the network responsive to receiving the request message.

14. The method of claim 13, wherein:
the request message specifies a duration of the timer; and
the setting of the timer comprises setting the timer to expire based on the duration.

15. The method of claim 5, wherein the trigger comprises a request to perform a radio-access-network notification-area update.

16. The method of claim 1, wherein:
the first core-network type comprises a Fifth-Generation Core network; and
the second core-network type comprises an Evolved Packet Core network.

17. A user equipment comprising:
a radio-frequency transceiver; and
a processor and memory system configured to:
establish a wireless connection to a network using a first base station that supports a first core-network type;
suspend the wireless connection to the network;
perform a cell-selection procedure that selects a second base station;
process system information received from the second base station to determine that the second base station supports a second core-network type different from the first core-network type; and
responsive to a determination that the second core-network type is different, perform in place of initiating a connection-resume procedure an operation comprising:
releasing the wireless connection to the network.

18. The user equipment of claim 17, the processor and memory system further configured to:
send a message to an upper layer.

19. The user equipment of claim 17, the processor and memory system further configured to:
operate the user equipment in a first resource control state responsive to suspension of the wireless connection to the network, wherein:
the first core-network type supports the first resource control state; and
the second core-network type does not support the first resource control state.

20. The user equipment of claim 19, wherein:
the first resource control state comprises an inactive state.

* * * * *